United States Patent
Skinner

(10) Patent No.: US 10,221,677 B2
(45) Date of Patent: Mar. 5, 2019

(54) PURGING OF FIBER OPTIC CONDUITS IN SUBTERRANEAN WELLS

(75) Inventor: Neal G. Skinner, Lewisville, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 22 days.

(21) Appl. No.: 13/342,652

(22) Filed: Jan. 3, 2012

(65) Prior Publication Data

US 2012/0118578 A1 May 17, 2012

Related U.S. Application Data

(63) Continuation of application No. 12/337,689, filed on Dec. 18, 2008, now Pat. No. 8,090,227.

(30) Foreign Application Priority Data

Dec. 28, 2007 (WO) .................. PCT/US07/89000

(51) Int. Cl.
*E21B 47/06* (2012.01)
*E21B 47/12* (2012.01)
(Continued)

(52) U.S. Cl.
CPC .............. *E21B 47/06* (2013.01); *E21B 47/12* (2013.01); *E21B 47/123* (2013.01);
(Continued)

(58) Field of Classification Search
CPC .. G02F 1/292; G02F 2201/30; G02F 2202/30; G02F 2203/10; H01S 3/0632;
(Continued)

(56) References Cited

U.S. PATENT DOCUMENTS 3,111,551 A     11/1963  D'Ascoli
4,748,969 A *   6/1988   Wardle ...................... 600/150
(Continued)

FOREIGN PATENT DOCUMENTS

WO   2007066146 A2   6/2007
WO   2008051945 A2   5/2008

OTHER PUBLICATIONS

Canadian Office Action issued for CA Patent Application No. 2,709,698, 3 pages.
(Continued)

*Primary Examiner* — Ryan A Lepisto
*Assistant Examiner* — Erin D Chiem
(74) *Attorney, Agent, or Firm* — Chamberlain Hrdlicka

(57) ABSTRACT

Purging of fiber optic conduits in subterranean wells. A downhole optical sensing system includes an optical line, at least two tubular conduits, one conduit being positioned within the other conduit, and the optical line being positioned within at least one of the conduits, and a purging medium flowed in one direction through one conduit, and flowed in an opposite direction between the conduits. A method of purging a downhole optical sensing system includes the steps of: installing at least two conduits and an optical line in a well as part of the sensing system, one conduit being positioned within the other conduit, and the optical line being positioned within at least one of the conduits; and flowing a purging medium through the conduits in the well, so that the purging medium flows in one direction through one conduit and in an opposite direction between the conduits.

14 Claims, 3 Drawing Sheets

(51) Int. Cl.
  *G02B 6/44* (2006.01)
  *G02B 6/38* (2006.01)
(52) U.S. Cl.
  CPC ......... *G02B 6/3827* (2013.01); *G02B 6/4427* (2013.01); *G02B 6/4436* (2013.01); *G02B 6/4464* (2013.01)
(58) Field of Classification Search
  CPC .......... H01S 3/1608; H01S 5/028; H01S 5/50; H01S 5/026; G02B 6/3827; G02B 6/4427; G02B 6/4436
  USPC ...... 385/12, 100, 125, 113, 109; 367/25, 64, 367/69, 81, 82, 83, 86, 103, 119, 911; 166/305.1, 177.3
  See application file for complete search history.

(56) References Cited

U.S. PATENT DOCUMENTS

| | | | |
|---|---|---|---|
| 4,927,232 A * | 5/1990 | Griffiths | ........................ 385/13 |
| 4,938,060 A | 7/1990 | Sizer et al. | |
| 4,941,349 A | 7/1990 | Walkow et al. | |
| 5,208,465 A * | 5/1993 | Jacobson | ............... G01N 21/17 250/573 |
| 5,275,038 A | 1/1994 | Sizer et al. | |
| 5,503,014 A | 4/1996 | Griffith | |
| 5,804,702 A | 9/1998 | Hovde et al. | |
| 5,892,176 A | 4/1999 | Findlay et al. | |
| 5,894,104 A | 4/1999 | Hedburg | |
| 6,201,917 B1 | 3/2001 | Campion et al. | |
| 6,237,421 B1 * | 5/2001 | Li | ........................... G01L 1/242 73/800 |
| 6,343,173 B2 | 1/2002 | Hordvik et al. | |
| 6,496,625 B1 | 12/2002 | Falkowich et al. | |
| 6,497,290 B1 | 12/2002 | Misselbrook et al. | |
| 6,690,866 B2 | 2/2004 | Bonja et al. | |
| 6,807,324 B2 * | 10/2004 | Pruett | .................. G01K 15/002 374/E11.015 |
| 6,907,170 B1 | 6/2005 | Maida, Jr. | |
| 6,957,574 B2 | 10/2005 | Ogle | |
| 7,017,417 B2 | 3/2006 | Daigle | |
| 7,024,081 B2 | 4/2006 | Dowd et al. | |
| 7,082,239 B2 | 7/2006 | Kuczma et al. | |
| 7,104,141 B2 | 9/2006 | Zerwekh et al. | |
| 7,134,491 B2 | 11/2006 | Kohli et al. | |
| 7,140,435 B2 | 11/2006 | Defretin et al. | |
| 7,160,368 B1 * | 1/2007 | Wakelin | ........................ 96/132 |
| 7,163,055 B2 | 1/2007 | Coon et al. | |
| 7,218,820 B2 | 5/2007 | Maida, Jr. | |
| 7,284,903 B2 * | 10/2007 | Hartog | ................... G01K 11/32 356/337 |
| 7,496,258 B1 | 2/2009 | Varkey | |
| 7,617,873 B2 * | 11/2009 | Lovell et al. | ............... 166/305.1 |
| 7,646,953 B2 * | 1/2010 | Dowd et al. | ................... 385/109 |
| 8,090,227 B2 * | 1/2012 | Skinner | ........................ 385/12 |
| 8,213,756 B2 * | 7/2012 | Herbst | ........................ 385/109 |
| 8,646,968 B2 * | 2/2014 | MacDougall | .......... G01K 11/32 374/161 |
| 2004/0043501 A1 | 3/2004 | Means et al. | |
| 2004/0145969 A1 | 7/2004 | Bai et al. | |
| 2004/0213529 A1 * | 10/2004 | Dowd et al. | ................... 385/109 |
| 2004/0258371 A1 * | 12/2004 | Kuczma et al. | ............... 385/100 |
| 2005/0051757 A1 * | 3/2005 | Shepodd et al. | ........... 252/181.1 |
| 2005/0236161 A1 | 10/2005 | Gay | |
| 2005/0263281 A1 * | 12/2005 | Lovell et al. | ............... 166/255.1 |
| 2006/0010973 A1 | 1/2006 | Brown | |
| 2006/0018611 A1 | 1/2006 | Maida, Jr. | |
| 2006/0153508 A1 * | 7/2006 | Bowker | .................. E21B 23/08 385/100 |
| 2006/0239330 A1 * | 10/2006 | Yamate | .................. G01K 11/32 374/161 |
| 2006/0260739 A1 | 11/2006 | Varkey | |
| 2006/0272809 A1 * | 12/2006 | Tubel et al. | .............. 166/250.01 |
| 2006/0280412 A1 | 12/2006 | Varkey | |
| 2007/0122104 A1 | 5/2007 | Chalifoux | |
| 2007/0133961 A1 | 6/2007 | Fairbanks | |
| 2007/0221377 A1 | 9/2007 | Vinegar | |
| 2007/0227741 A1 | 10/2007 | Lovell | |
| 2008/0273852 A1 * | 11/2008 | Parker | ........................ G01J 5/08 385/128 |
| 2009/0166042 A1 * | 7/2009 | Skinner | ........................ 166/305.1 |
| 2009/0202192 A1 * | 8/2009 | Taverner | .................. E21B 47/04 385/12 |
| 2010/0008632 A1 * | 1/2010 | Herbst | ........................ 385/109 |
| 2011/0171370 A1 | 7/2011 | Holzmueller et al. | |
| 2012/0076464 A1 * | 3/2012 | Dowd et al. | ................... 385/109 |
| 2013/0192640 A1 | 8/2013 | Skinner et al. | |

OTHER PUBLICATIONS

International Search Report and Written Opinion dated Apr. 30, 2008, for International Patent Application Serial No. PCT/US07/89000, 7 pages.
AFL Telecommunications, Minibend Product Brochure, Aug. 29, 2007, 1 page.
AFL Telecommunications, Stainless Steel Fiber Optic Tubes Product Brochure, Apr. 1, 2005, 1 page.
International Preliminary Report on Patentability dated Jul. 8, 2010, for International Patent Apptication Serial No. PCT/US07/069000, 6 pages.
Office Action dated Apr. 29, 2011 for U.S. Appl. No. 12/337,689, 13 pages.
Supplementary European Search Report dated May 3, 2012 for EPC Patent Application No. 07870010.1, 6 pages.
International Search Report and Written Opinion dated Apr. 30, 2013 for PCT Patent Application No. PCT/US2013/021070, 9 pages.
Office Action dated Feb. 21, 2014 for U.S. Appl. No. 13/359,159, 38 pages.
"European Application Serial No. 07870010.1, Summons to Attend Oral Proceedings dated Jan. 14, 2016", 4 pgs.

* cited by examiner

PURGING OF FIBER OPTIC CONDUITS IN SUBTERRANEAN WELLS

CROSS-REFERENCE TO RELATED APPLICATIONS

This application is a Continuation of U.S. patent application Ser. No. 12/337,689 filed Dec. 18, 2008 (now issued U.S. Pat. No. 8,090,227), which claims the benefit under 35 USC § 119 of the filing date of International Application No. PCT/US07/89000, filed Dec. 28, 2007. The entire disclosures of these prior applications are incorporated herein by this reference.

BACKGROUND

The present invention relates generally to equipment utilized and operations performed in conjunction with subterranean wells and, in an embodiment described herein, more particularly provides for purging of fiber optic conduits in subterranean wells.

It is very important for optical fibers to be well protected when they are used in harsh, hostile environments. For example, in high temperature environments, such as in steam injection wells or other high temperature well environments, there are a variety of possibly damaging effects to guard against.

One effect of high temperature environments on optical fibers is accelerated hydrogen darkening. In some cases, an optical fiber can become unusable due to hydrogen darkening within a few days of its installation.

Therefore, it will be appreciated that improvements are needed in the art of protecting optical fibers in hostile environments.

SUMMARY

In carrying out the principles of the present invention, a downhole optical sensing system and associated method are provided which solve at least one problem in the art. One example is described below in which an optical fiber is installed within coaxial conduits for convenient purging of hydrogen from about the optical fiber. Another example is described below in which a purging medium is circulated downhole and returned from downhole via the coaxial conduits.

In one aspect, a downhole optical sensing system is provided. The system includes at least one optical line and at least two tubular conduits. One conduit is positioned within the other conduit. The optical line is positioned within at least one of the conduits. A purging medium is flowed in one direction through one conduit, and is flowed in an opposite direction between the conduits.

In another aspect, a method of purging a downhole optical sensing system is provided. The method includes the steps of: installing at least two conduits and an optical line in a well as part of the sensing system, one conduit being positioned within the other conduit, and the optical line being positioned within at least one of the conduits; and flowing a purging medium through the conduits in the well, so that the purging medium flows in one direction through one conduit and in an opposite direction between the conduits.

These and other features, advantages, benefits and objects will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
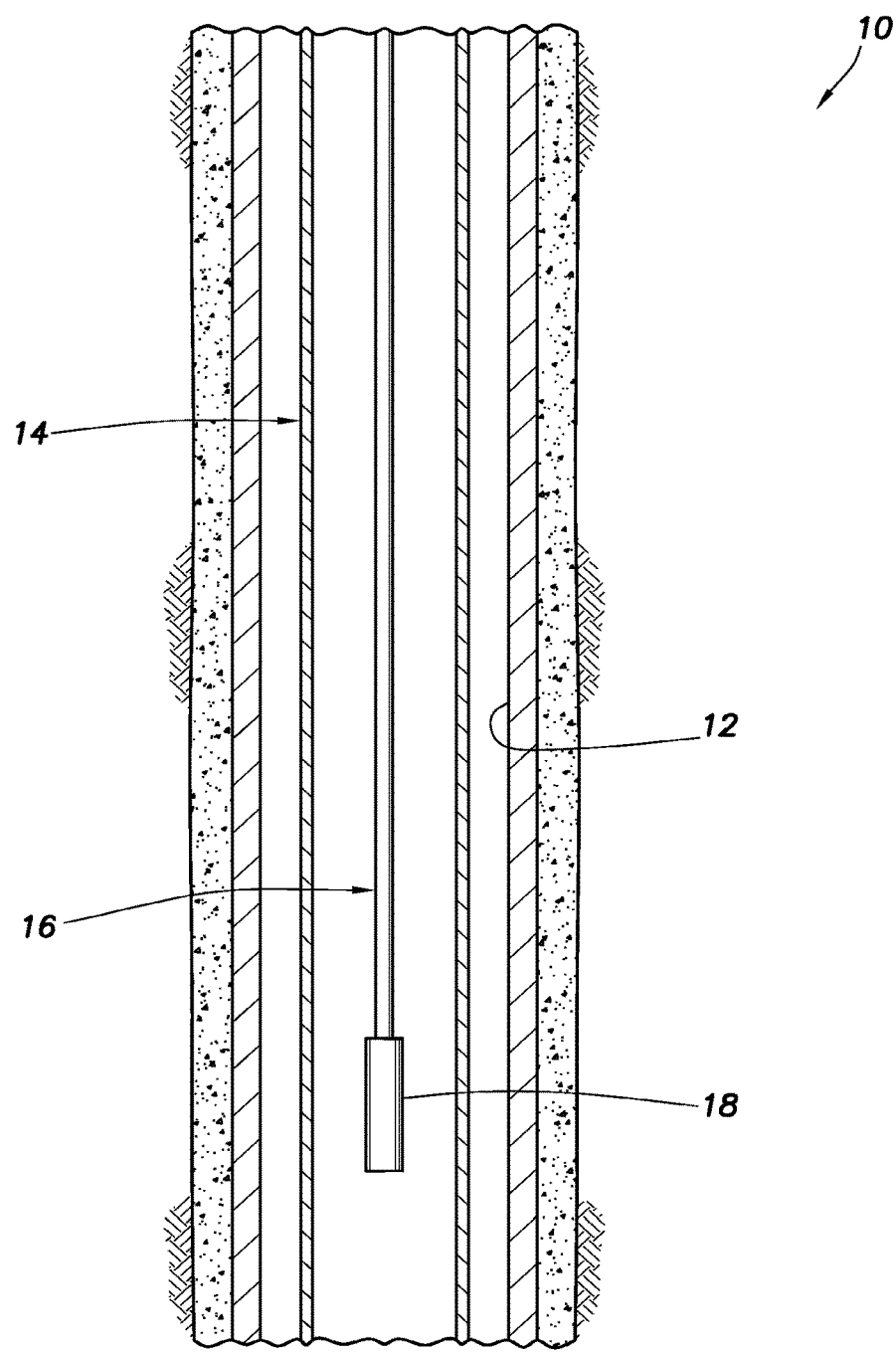
FIG. 1 is a schematic partially cross-sectional view of a system and method embodying principles of the present invention.

Representatively illustrated in FIG. 1 is an optical sensing system 10 and associated method which embody principles of the present invention. The system 10 in this example is used to sense fluid properties or other parameters in a wellbore 12. However, the principles of the invention may be used for other purposes, as well.

As depicted in FIG. 1, a production tubing string 14 has been installed in the wellbore 12. Attached to the tubing string 14 during installation is a conduit assembly 16 and a sensor 18. The conduit assembly 16 and sensor 18 may be separately attached to the tubing string 14 (for example, using clamps, etc.), or the conduit assembly and/or the sensor 18 could be integrally formed with the tubing string 14.

As another alternative, the conduit assembly 16 and/or sensor 18 could be installed in the wellbore 12 whether or not the tubing string 14 is also installed in the wellbore. Therefore, it should be clearly understood that the principles of the invention are not limited in any way to the details of the system 10 illustrated in the drawings or described herein.

Figure 2:
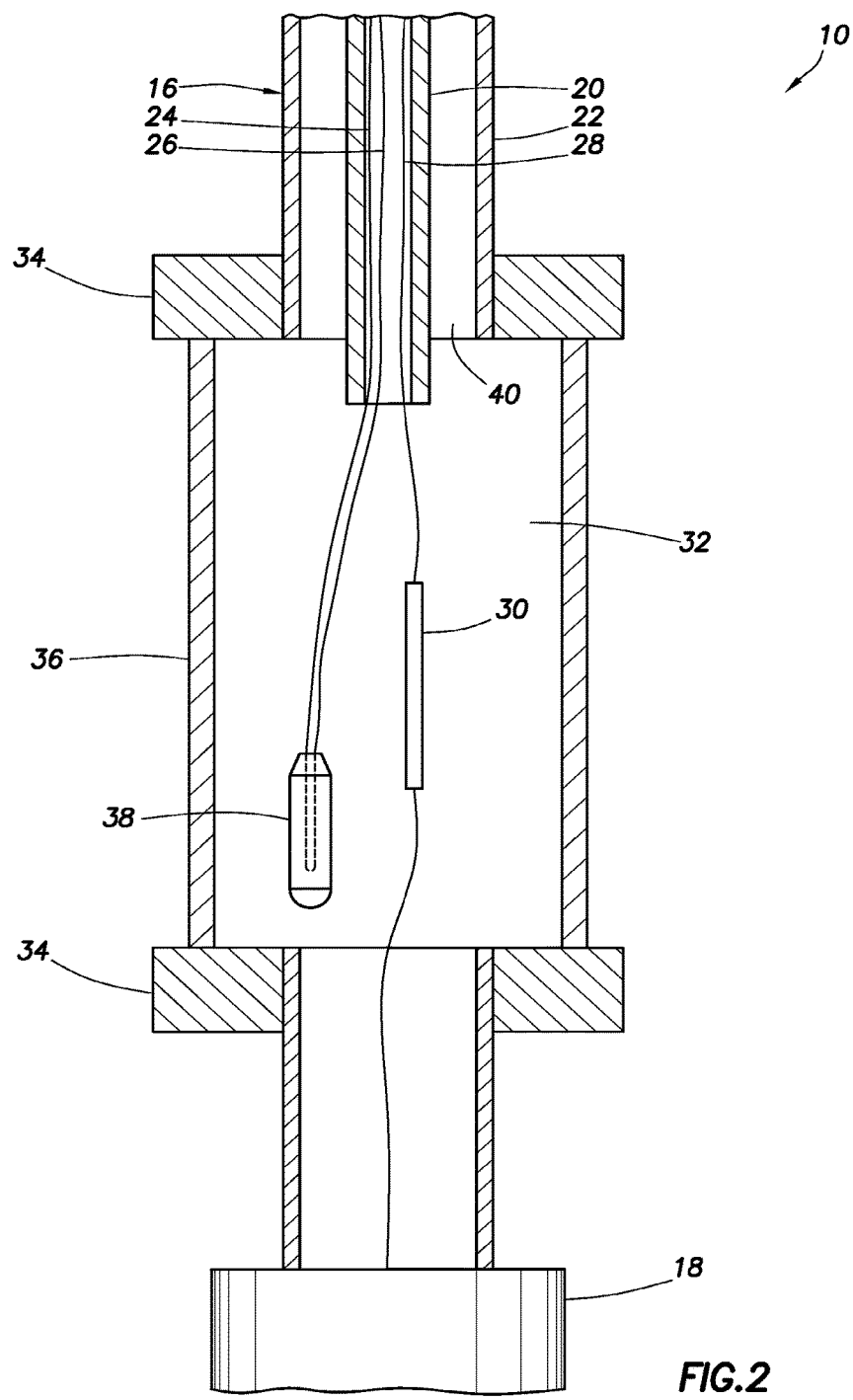
FIG. 2 is an enlarged scale schematic partially cross-sectional view of the optical sensing system.

Referring additionally now to FIG. 2, an enlarged scale cross-sectional view of a portion of the system 10 is representatively illustrated. In this view it may be seen that the conduit assembly 16 includes an inner conduit 20 and an outer conduit 22.

Multiple optical waveguides or lines 24, 26, 28 are contained within the conduits 20, 22. Although three lines 24, 26, 28 are depicted in FIG. 2, any number of optical lines (including one) may be used. The lines 24, 26, 28 may be of the type known as optical fibers or any other type of optical waveguide.

In addition, any number of conduits may be used. Although the conduit 20 is described for convenience herein as an "inner" conduit, another conduit could be contained within the conduit 20, and although the conduit 22 is described for convenience herein as an "outer" conduit, another conduit could be external to the conduit 22. The conduits 20, 22 may be made of any suitable material, such as stainless steel, polymers, composites, etc.

The optical lines 24, 26 are preferably used for distributed temperature sensing (DTS), a technique well known to those skilled in the art, in which backscattered light is analyzed to determine the temperature distribution along optical lines or fibers. In this manner, the lines 24, 26 themselves comprise temperature sensors in the optical sensing system 10.

The optical line 28 is preferably operatively connected to the sensor 18 (for example, via a fusion splice 30). The sensor 18 could be a sensor designed to detect a property at a single location, such as a pressure sensor. The sensor 18 could be an optical sensor (such as the pressure sensor described in U.S. Pat. No. 7,159,468), or it could be another type of sensor.

The splice 30 is preferably contained within a chamber 32. The chamber 32 is preferably connected between the sensor 18 and a lower end of the conduit assembly 16, for example, using pressure isolating fittings 34 at either end of a tubular housing 36. However, other arrangements and configurations may be used in keeping with the principles of the invention.

In the example of FIG. 2, a conventional 180-degree turnaround 38 in the chamber 32 is operatively connected to the lines 24, 26, so that the lines and the turnaround form a continuous optical waveguide from a remote location (such as the earth's surface) to a downhole location, and back to the remote location. This arrangement permits more accurate double-ended (as opposed to single-ended) distributed temperature measurements to be obtained using the lines 24, 26.

An acceptable turnaround for use in the system 10 is manufactured by AFL Telecommunications LLC of Duncan, S.C. USA. Fusion splices (such as the fusion splice 30) may be used to connect the lines 24, 26 to the turnaround 38.

In one beneficial feature of the system 10, the chamber 32 is in communication with the interior of the inner conduit 20, and in communication with the space 40 between the conduits 20, 22. In this manner, a continuous flow passage is formed from the remote location (such as the earth's surface, sea floor, etc.) to the downhole location at the chamber 32, and back to the remote location.

This configuration permits a purging medium 42 (see FIGS. 3 & 4) to be flowed in one direction downhole, and flow in an opposite direction uphole, in order to purge hydrogen from about the lines 24, 26, 28. For example, the purging medium 42 could comprise gas (such as nitrogen or another inert gas, air, etc.), a liquid, gel, etc. The purging medium 42 could have hydrogen scavenging capability.

Figure 3:
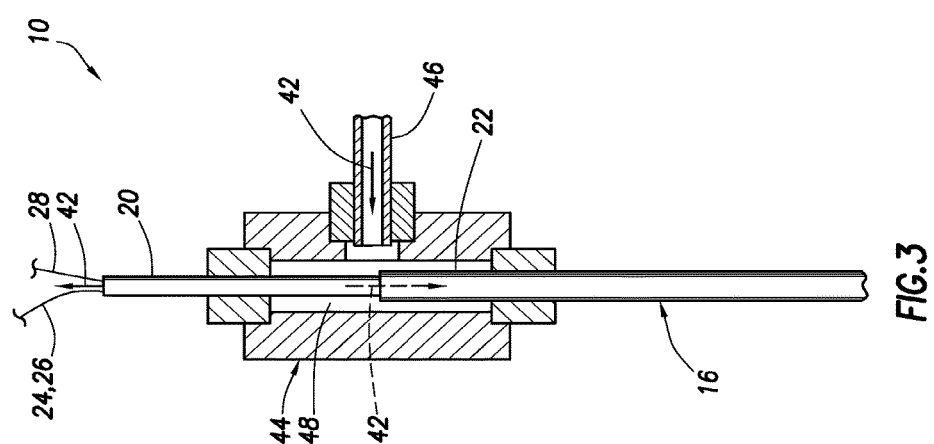
FIG. 3 is a schematic partially cross-sectional view of a method of purging the optical sensing system.

Referring additionally now to FIG. 3, one method of purging the hydrogen from about the lines 24, 26, 28 in the conduit assembly 16 is representatively illustrated. This method utilizes a purging device 44 connected to an upper end of the conduit assembly 16 at the remote location.

The purging medium 42 is flowed via a conduit 46 into an interior chamber 48 of the device 44. The chamber 48 is in communication with the space 40 between the conduits 20, 22. Thus, the purging medium 42 flows downhole through the space 40 between the conduits 20, 22, into the chamber 32 at the lower end of the conduit assembly 16, and then back uphole to the remote location via the interior of the inner conduit 20. In this manner, hydrogen is purged from about the lines 24, 26, 28 in the conduit assembly 16.

Figure 4:
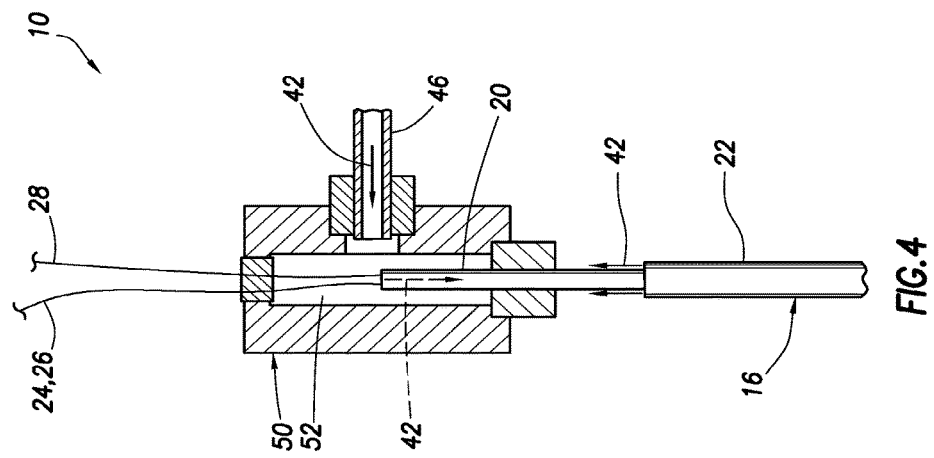
FIG. 4 is a schematic partially cross-sectional view of an alternate method of purging the optical sensing system.

Referring additionally now to FIG. 4, another method of purging the hydrogen from about the lines 24, 26, 28 in the conduit assembly 16 is representatively illustrated. This method utilizes a somewhat differently configured purging device 50 connected to an upper end of the conduit assembly 16 at the remote location.

The purging medium 42 is flowed via the conduit 46 into an interior chamber 52 of the device 50. The chamber 52 is in communication with the interior of the conduit 20. Thus, the purging medium 42 flows downhole through the interior of the inner conduit 20, into the chamber 32 at the lower end of the conduit assembly 16, and then back uphole to the remote location via the space 40 between the conduits 20, 22. In this manner, hydrogen is purged from about the lines 24, 26, 28 in the conduit assembly 16.

It may now be fully appreciated that the above description of representative examples of the system 10 and associated methods provide important advancements in the art of protecting optical lines from damage in harsh, hostile environments. In particular, the system 10 and methods described above enable convenient, efficient and inexpensive purging of conduits 20, 22 in order to protect the lines 24, 26, 28 from hydrogen darkening. Other uses may be made of the system 10 and methods in keeping with the principles of the invention.

Described above is a downhole optical sensing system 10 which includes at least one optical line 24, 26, 28 and at least two tubular conduits 20, 22. One conduit 20 is positioned within the other conduit 22. The optical line 24, 26, 28 is positioned within at least one of the conduits 20, 22. A purging medium 42 is flowed in one direction through one conduit 20, and flowed in an opposite direction between the conduits 20, 22.

The optical line 28 may be operatively connected to a downhole sensor 18. The optical lines 24, 26 may comprise a downhole sensor. The optical lines 24, 26, 28 may be positioned within the inner conduit 20.

The purging medium 42 may comprise a gas. The purging medium 42 may comprise a hydrogen scavenging medium.

The purging medium 42 may be flowed downhole in a first direction and return uphole in a second direction. The purging medium 42 may be flowed downhole in the second direction and return uphole in the first direction.

The system 10 may also include a downhole chamber 32 in fluid communication with an interior of the inner conduit 20 and an annular space 40 between the conduits 20, 22. The system 10 can include a 180-degree turnaround in the optical lines 24, 26 within the downhole chamber 32.

Also described above is a method of purging a downhole optical sensing system 10. The method includes the steps of: installing at least two conduits 20, 22 and at least one optical line 24, 26, 28 in a well as part of the sensing system 10, one conduit 20 being positioned within the other conduit 22, and the optical line 24, 26, 28 being positioned within at least one of the conduits; and flowing a purging medium 42 through the conduits in the well, so that the purging medium flows in one direction through one conduit 20 and in an opposite direction between the conduits 20, 22.

The method may include operatively connecting the optical line 28 to a downhole sensor 18. The method may include utilizing the optical line 24, 26 as a downhole sensor.

The method may include flowing the purging medium 42 downhole in one direction and returning the purging medium from downhole in the opposite direction. The method may include flowing the purging medium 42 downhole in the second direction and returning the purging medium from downhole in the first direction.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A downhole optical sensing system for use in a well, comprising:
   optical lines;
   a first conduit being positioned within a second conduit, and the optical lines positioned within either or both the first or the second conduit such that one of the optical lines comprises a turnaround to form a continuous optical waveguide configured to perform double-ended measurements, an interior of the first conduit being in fluid communication with an annulus between the first and second conduits;
   a downhole chamber in fluid communication with the interior of the first conduit and the annulus between the first and second conduits;
   a downhole sensor in fluid communication with the downhole chamber outside the first and second tubular conduits; and
   wherein the first conduit and the annulus are configured such that a purging medium comprising a hydrogen scavenging substance in gas or gel form is able to flow in a first direction through the first conduit and is able to flow through the annulus in a second direction opposite to the first direction and chemically react with and purge hydrogen from about the optical lines as the substance flows into contact with the hydrogen while the first and second conduits are downhole in the well.

2. The system of claim 1, wherein one of the optical lines is operatively connected to the downhole sensor.

3. The system of claim 1, wherein one of the optical lines comprises the downhole sensor.

4. The system of claim 1, wherein the downhole sensor comprises a pressure gauge.

5. The system of claim 1, wherein the first conduit and the annulus are configured such that the hydrogen scavenging medium is able to flow downhole in the first direction and is able to return in the second direction.

6. The system of claim 1, wherein the first conduit and the annulus are configured such that the purging medium is able to flow downhole in the second direction and is able to return in the first direction.

7. The system of claim 1, further comprising:
   a turnaround disposed in the downhole chamber;
   two splices to connect two optical lines to the turnaround in the downhole chamber; and
   a splice disposed in the downhole chamber to operatively connect one of the optical lines to the downhole sensor.

8. A method of purging a downhole optical sensing system, the method comprising:
   installing first and second conduits and optical lines in a well, the first conduit being positioned within the second conduit, and the optical lines being positioned within either or both of the first and second conduits such that one of the optical lines comprises a turnaround to form a continuous optical waveguide configured to perform double-ended measurements, an interior of the first conduit being in fluid communication with an annulus between the first and second conduits, and the interior of the first conduit and the annulus between the first and second conduits in fluid communication with a downhole chamber, the downhole chamber in fluid communication with a downhole sensor outside the first and second tubular conduits; and
   flowing a purging medium comprising a hydrogen scavenging substance in gas or gel form through the first and second conduits in the well, so that the purging medium flows in a first direction through the first conduit and in a second direction opposite to the first direction between the first and second conduits and chemically reacts with and purges hydrogen from about the optical lines as the substance flows into contact with the hydrogen.

9. The method of claim 8, wherein installing further comprises operatively connecting the at least one optical line to the downhole sensor.

10. The method of claim 8, further comprising utilizing the at least one optical line as a downhole sensor.

11. The method of claim 8, wherein the downhole sensor comprises a pressure gauge.

12. The method of claim 8, wherein flowing the purging medium further comprises flowing the purging medium downhole in the first direction and returning the purging medium from downhole in the second direction.

13. The method of claim 8, wherein flowing the urging medium further comprises flowing the purging medium downhole in the second direction and returning the purging medium from downhole in the first direction.

14. The method of claim 8, wherein installing further comprises:
   providing a turnaround disposed in the downhole chamber;
   forming a splice connecting two optical lines to the turnaround in the downhole chamber; and
   forming a splice disposed in the downhole chamber operatively connecting one of the optical lines to the downhole sensor.

* * * * *